Jan. 13, 1948.  S. N. WEKEMAN  2,434,378
PHOTOGRAPHIC REVERSING UNIT AND SYSTEM FOR PRODUCING REVERSED IMAGES
Filed July 15, 1944  3 Sheets-Sheet 1
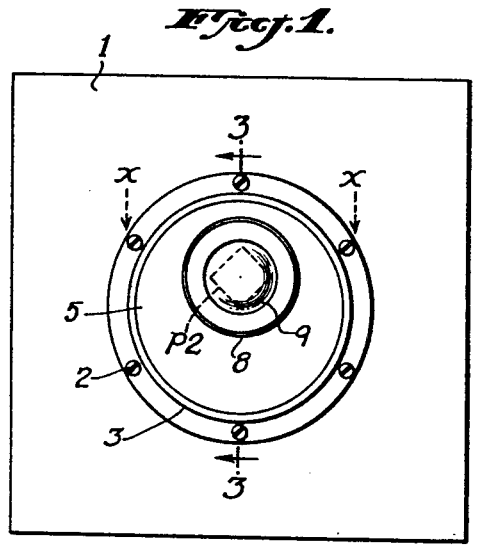
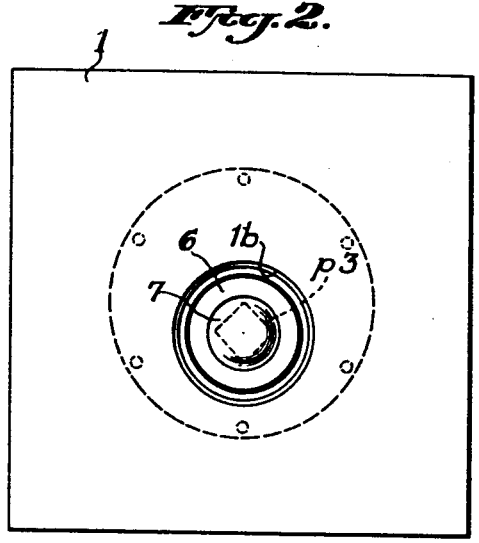
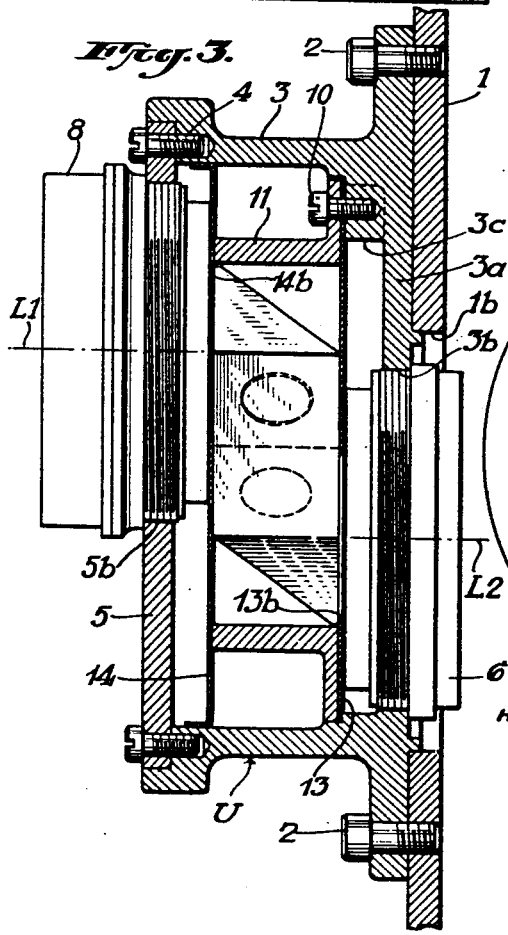
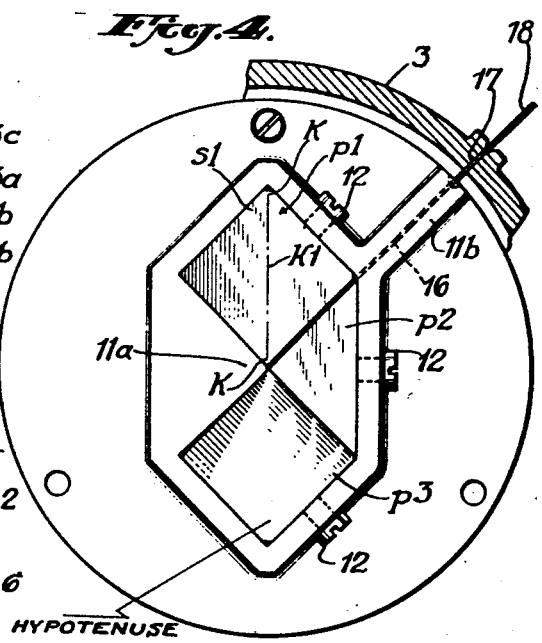
INVENTOR.
STEPHEN N. WEKEMAN.
BY
Ward, Crosby & Neal
ATTORNEYS.

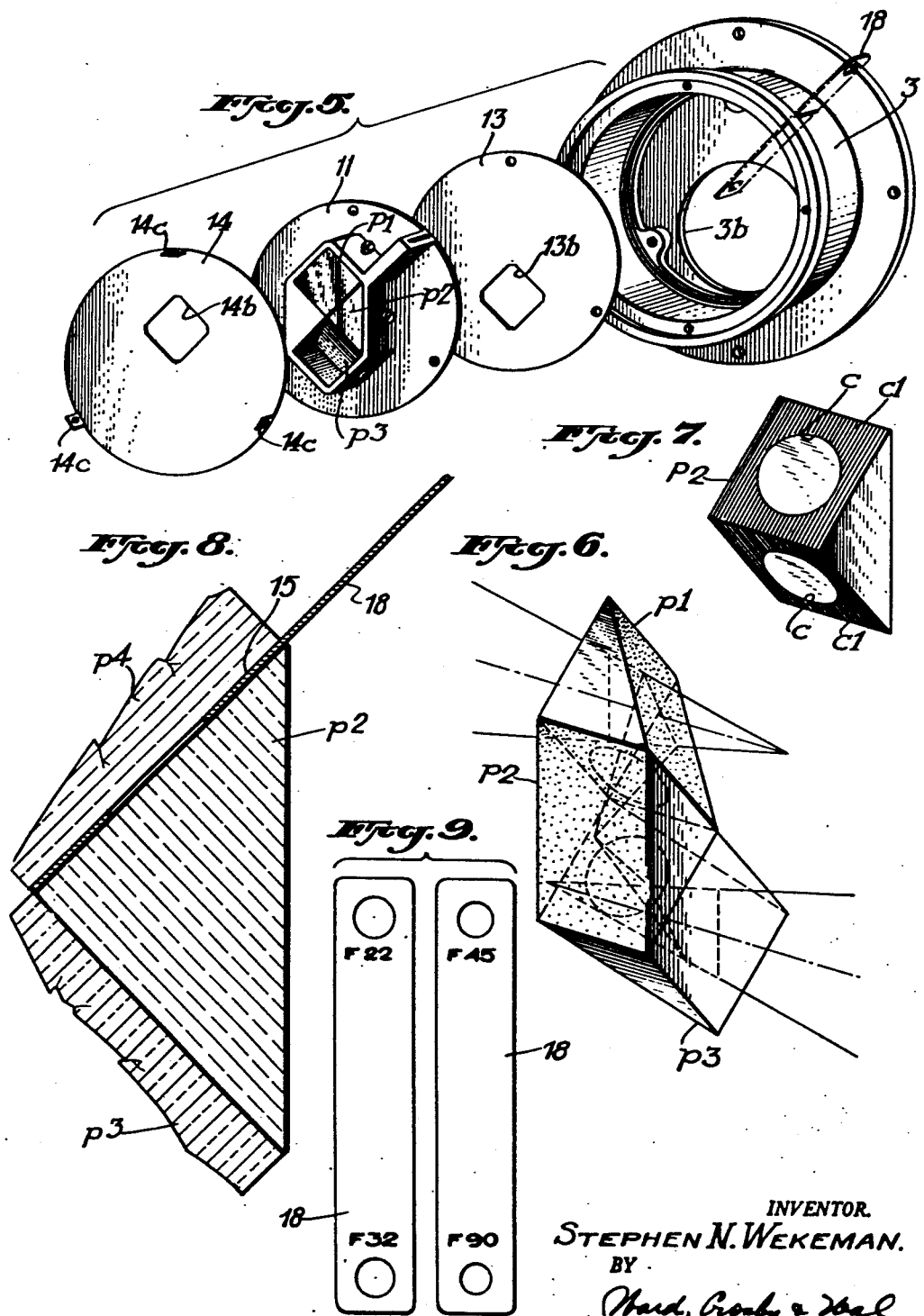

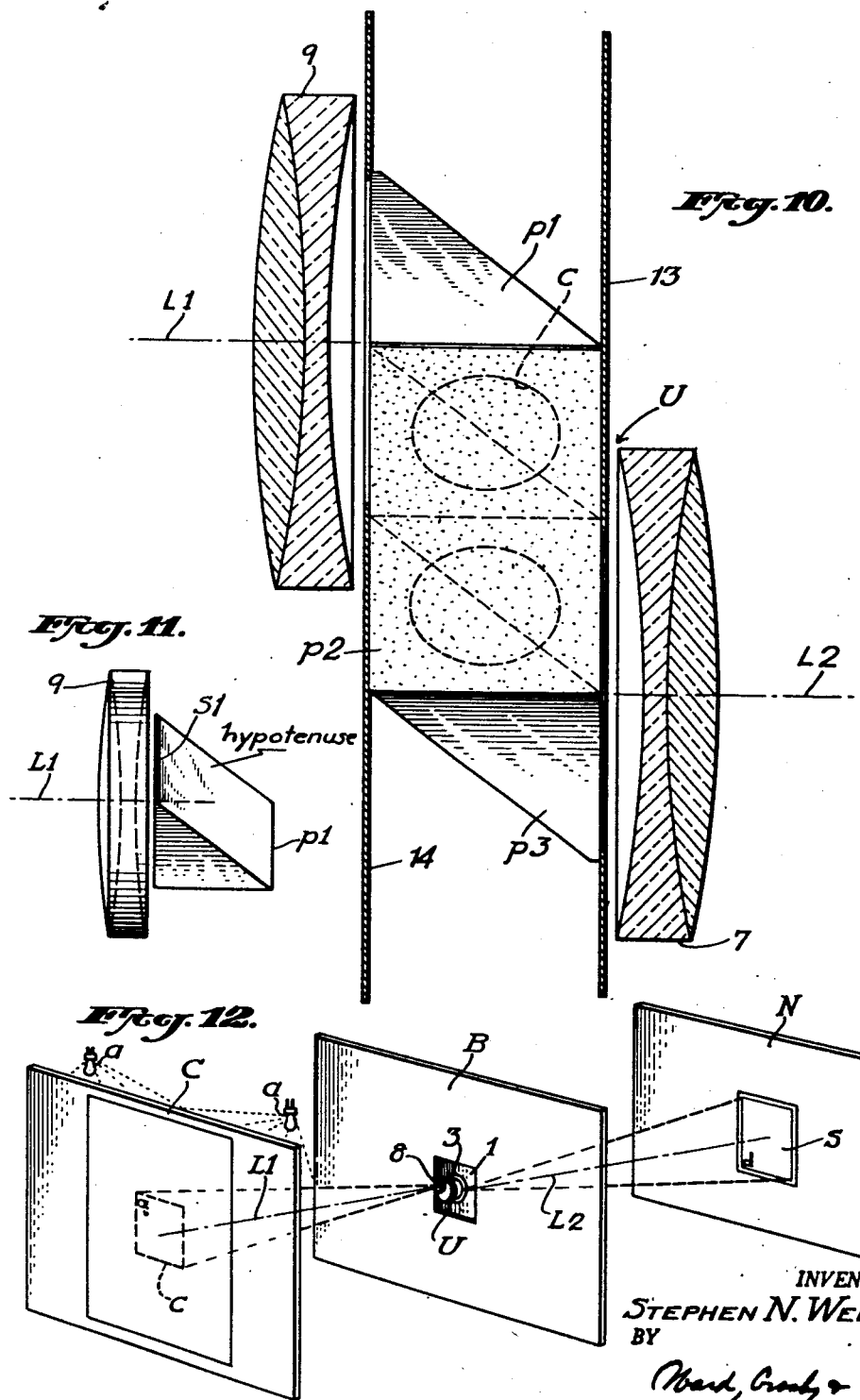

Patented Jan. 13, 1948

2,434,378

UNITED STATES PATENT OFFICE 2,434,378

PHOTOGRAPHIC REVERSING UNIT AND SYSTEM FOR PRODUCING REVERSED IMAGES

Stephen N. Wekeman, Saddle River Township, Bergen County, N. J., assignor to Sun Chemical Corporation, a corporation of Delaware Application July 15, 1944, Serial No. 545,090

6 Claims. (Cl. 88—57)

My invention relates to photographic reversing units and to a camera system or other projection system in which such a reversing unit is incorporated.

My invention has particular reference to a camera system or the like which includes a photographic reversing unit comprising an objective lens and associated prism means for producing on a light-sensitive surface a reversed image of a selected copy, the light beam traveling along parallel paths at the respective opposite sides of said reversing unit.

My invention has further reference to a photographic reversing unit comprising a housing which supports spaced sets of objective lens elements, said housing also supporting three prisms disposed between said sets of lens elements for reversing the projected image.

Various other objects, advantages and features of my invention will become apparent from the following detailed description.

My invention resides in the camera or other projecting arrangement and in the novel photographic reversing unit of the character hereinafter described and claimed.

For an understanding of my invention and for an illustration of one of the forms thereof, reference is to be had to the accompanying drawings, in which:

Figures 1 and 2 are elevational views showing the respective opposite ends of my novel photographic reversing unit;

Fig. 3 is an enlarged vertical sectional view, taken on the line 3—3 of Fig. 1 looking in the direction of the arrows;

Fig. 4 is a transverse vertical sectional view showing a part of the unit illustrated in Fig. 3;

Fig. 5 is a perspective view showing parts of my reversing unit in disassembled relation;

Fig. 6 is a perspective view showing the associated prisms of my invention;

Fig. 7 is a perspective view showing one of the prisms illustrated in Fig. 6;

Fig. 8 is a fragmentary elevational view illustrating the use of a stop member;

Fig. 9 is an elevational view showing a pair of stop members utilizable with my reversing unit;

Fig. 10 is an enlarged elevational view principally showing the optical parts of my reversing unit;

Fig. 11 is a top plan view looking in the direction indicated by the arrows x and x, Fig. 1; and Fig. 12 is a perspective view diagrammatically illustrating an application of the invention.

In general, my invention relates to a photographic reversing unit U as hereinafter described, said unit being positioned between a copy sheet and a light-sensitive surface for producing on the latter an image of the copy sheet which is photographically "reversed." The copy sheet may be either a positive or negative and will hereinafter be referred to as a "copy sheet" or "copy."

Referring to the drawings, I represents any suitable plate provided with a passage $1b$ utilizable as hereinafter described. In accordance with the invention, the plate I is adapted to be detachably associated with the lens board of a camera. Suitably secured to the plate I, as by the screws 2, is a housing 3 which comprises a plate section $3a$ disposed flatwise against the plate I and having a passage $3b$ alined with the passage $1b$ of said plate I. Suitably secured to the housing 3, as by the screws 4, is a plate 5 having a passage $5b$ which is non-alined with respect to the aforesaid alined passages $1b$, $3b$. Threaded into the passage $3b$ of the housing 3 is a casing 6 for a pair or set of lens elements 7, Fig. 11. In a similar manner, a casing 8 for a pair or set of lens elements 9, Fig. 11, is threaded into a passage $5b$ of the plate 5. The two sets of lens elements 7 and 9 form an objective lens having a fixed focal length.

Disposed within the housing 3 and suitably secured to inwardly projecting lugs $3c$ thereof, as by the respective screws 10, is the flange of a casing 11 having an inwardly extending section $11a$, Fig. 4. The casing 11 serves as the support for three right angle reflecting prisms $p1$, $p2$ and $p3$ which are secured thereto by the respective screws 12 or in such other suitable manner as may be desired. As will be noted, one face of each of the prisms $p1$, $p3$ seats against a face of the casing section $11a$, the other prism $p2$ being disposed opposite said casing section $11a$.

Disposed between the aforesaid lugs $3c$ of the housing 3 and the flange of the casing 11 is a sheet-like member 13 which is opaque to light rays except for a passage $13b$ formed therein, Fig. 5, this passage $13b$ being in alinement with the aperture of the set of lens elements 7. As illustrated, the member 13 is secured in position by the above described screws 10.

At the opposite side of the casing 11, there is disposed a sheet-like member 14 which is opaque to light rays except for a passage $14b$ formed therein, Fig. 5, this passage $14b$ being in alinement with the aperture of the set of lens elements 9. The member 14 may be fixed in position interiorly of the housing 3 in any suitable manner, as by screws, not shown, which extend through the respective tabs 14c formed integral with said member 14, these screws being threaded into the housing 3.

In accordance with the invention, the prisms p1, p2 and p3 are duplicates and they are of the right angle triangular reflecting type. For purposes of explanation, the plane prism surfaces will be referred to in the same sense as applies to the respective sides and hypotenuse or a right-angle triangle. Thus, as shown in Fig. 7, the prism p2 has two sides which meet in a right angle, these sides being opposite the hypotenuse of the prism. The same is true with respect to the prisms p1 and p3.

As illustrated in Fig. 7, one or both of the aforesaid meeting sides of the prism p2, with the exception of a central section c, preferably circular, is coated with paint as indicated at c1 or otherwise covered with suitable material, such paint or material being opaque to light rays. The hypotenuse of each prism may have thereon a coating of silver if desired.

As illustrated in Figs. 4 and 8, the arrangement is such that the prisms p1 and p2 are spaced apart to some extent to define a passage 15 which is alined with a passage 16 formed in the casing 11 and a lateral section 11b thereof, the passages 15 and 16 being alined with a passage 17 opening through the housing wall 3. In Fig. 9, I have illustrated a pair of stop members 18 each of which has an aperture at the end thereof, these apertures having different diameters as will be understood. Either end of either member 18 may be slidably inserted in the aforesaid alined passages to provide a desired stop opening for the disclosed photographic reversing unit.

In accordance with the invention, the prism p1 is positioned opposite the set of lens elements 9 in the following manner: One side s1, Figs. 3, 4 and 11, of the prism p1 is disposed in a plane at right angles to the axis of the set of lens elements 9 or to the coinciding axis L1 of the projecting light beam as it traverses said set of lens elements 9. Further, a line k1 connecting the corners k, k of said prism side s1, Fig. 4, is intercepted at its mid-point by the aforesaid light beam axis L1. Hence, the side s1 of the prism p1 faces the set of lens elements 9 in symmetrical relation. In this connection, the aforesaid side s1 of the prism p1 is that side thereof which, when positioned as stated, causes the hypotenuse of said prism p1 to assume the inclined relation illustrated in Fig. 11.

The prism p3 is positioned opposite the set of lens elements 7 in a similar manner to that described above with respect to the location of the prism p1 opposite the set of lens elements 9. In connection with the prism p3, the side thereof which is disposed in a plane at right angles to the axis of the set of lens elements 7 or to the coinciding axis L2 of the projecting light beam as it traverses said set of lens elements 7 is that side which causes the hypotenuse of said prism p3 to assume the inclined relation shown in Fig. 4.

When the prisms p1 and p3 are positioned as described above, a pocket is formed for the reception of the prism p2 as indicated in Figs. 4 and 6.

Referring to Fig. 12, I have diagrammatically shown a copyboard C having secured thereto a copy sheet c which, as indicated, is non-transparent although it will be understood that, if desired, the sheet c may be of transparent character. Disposed opposite the copyboard or copy holder C is a negative holder N which, as known in the art, carries a member s having thereon a light-sensitive coating which faces the copy c. Positioned between the holders C and N is a lens board B having secured thereto the hereinbefore described photographic reversing unit U with the lens elements 9 facing the copy c and the lens elements 7 facing the light-sensitive surface s. When the copy c is illuminated by energization of the light sources a, a projecting light beam is produced which passes from said copy c to the light-sensitive surface s, this light beam traversing the reversing unit U.

When the projecting light beam traverses the reversing unit U, it engages, in the order named, the set of lens elements 9, the prisms p1, p2, p3 and the set of lens elements 7.

As regards the prism p1, the projecting light beam enters at the side s1 and emerges at an adjacent side, the hypotenuse of said prism p1 causing the light beam to take a right-angular path between said prism sides. A corresponding action occurs with respect to the prisms p2 and p3 and, therefore, the projecting light beam engages the hypotenuse of each of said last named prisms with resultant reflection thereof along a path related at right angles to the entrance path. By the three prisms, then, the projecting light beam is caused to traverse a path having three right angles therein. By virtue of the fact that the prisms p1, p2 and p3 are positioned as described, the net result of the combined prism action is as follows: The axis L2 of the projecting light beam as it traverses the set of lens elements 7 is offset while remaining substantially parallel with respect to the axis L1 of the projecting light beam as it traverses the set of lens elements 9.

The sets of lens elements 9 and 7 constitute an objective lens which operates in the conventional manner as regards lenses of this character. That is, the function of the disclosed objective lens is not modified by the prisms p1, p2 and p3. The three prisms, in accordance with the invention, serve merely to produce reversal of the image projected onto the light-sensitive surface s. As indicated in Fig. 6, the lens elements 9 cause the projecting light beam to focus on the hypotenuse of the prism p2.

As an incident of the image-reversal described above, the three prisms cause the axis L2 of the projecting light beam as it leaves the lens elements 7 to be displaced as regards the axis L1 of the projecting light beam entering the lens elements 9. However, these axes L1 and L2 are parallel or substantially so and this is a desirable feature of the invention. It is to be particularly noted that in the arrangement above described the distance between the axes L1 and L2 (Fig. 10) is relatively small, that is, the offset distance between the objective lens elements 9 and 7 must be less than, and preferably substantially less than, the diameter of the objective lens elements. It is also noted that the objective comprising the lens elements 7 and 9 has a fixed focal length.

Accordingly, by my invention, there is obtained on the light-sensitive surface of the sheet s a reversed image of the copy sheet c. As disclosed in Fig. 12, the image is reversed and also shifted in a vertical direction. This occurs by reason of the fact that the axes L1, L2 of the projection light beam occupy a vertical plane. Should the reversing unit U be rotated through an angle of forty-five degrees, the shift of the reversed image would be in a horizontal direction.

In view of the foregoing description, it will be understood that the photographic reversing unit of my invention is advantageous in several important respects. Thus, the plate 1 is of such character that it may readily be substituted on a camera for the usual plate which carries the camera objective lens. The reversing unit, particularly the prisms thereof, is small dimensionally and is of little weight. The entire unit is enclosed and, hence, deterioration resulting from contact of optical parts with the atmosphere is reduced to a minimum.

In view of the fact that the axes L1 and L2 are parallel, it results that the desired image reversal is obtained by "straight-line" projection. There is no undesirable camera framework extending at right angles to the main camera framework as in prior practice.

The prism $p2$ should have one or both of the coatings $c1$, this being desirable from the viewpoint of minimizing the formation of ghost images. The reversal is obtained by reflection at the prism hypotenuses and this is advantageous. The unit has ample coverage and, over the desired field, it is color-corrected and there is no objectionable distortion.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A photographic reversing unit adapted to be detachably associated with the lens board of a camera or the like, comprising a housing, an objective lens in said housing and comprising spaced sets of lens elements, and three right angle reflecting prisms enclosed in said housing interposed between said sets of lens elements, a first of said right angle reflecting prisms having one right angle face disposed adjacent the interior face of and in axial alignment with and normal to the axis of one of said objective lens sets, and a second of said right angle reflecting prisms having one right angle face disposed adjacent the interior face of and in axial alignment with and normal to the axis of the other of said objective lens sets, and the third of said right angle reflecting prisms being intermediate said first and second right angle reflecting prisms and having its two right angle faces disposed respectively adjacent and substantially parallel to the other of said right angle faces of said first and second reflecting prisms and having its hypotenuse face substantially parallel to a plane passing through the axes of said objective lens units, the axis of the projecting light beam as it leaves said reversing unit being parallel or substantially so with respect to the axis of the projecting light beam as it enters said reversing unit.

2. A photographic reversing unit comprising a housing providing spaced apart front and rear walls and an intermediate wall providing therewith a substantially dust-proof enclosure, spaced sets of objective lens elements carried by the respective front and rear walls of said housing and having their axes offset a distance less than the diameter of one of said lens elements, a first right angle reflecting prism having one right angle face disposed contiguous the interior face of and in axial alignment with and normal to the axis of one of said objective lens sets, a second right angle reflecting prism having one right angle face disposed contiguous the interior face of and in axial alignment with and normal to the axis of the other of said objective lens sets, and a third right angle reflecting prism intermediate said first and second right angle reflecting prisms and having its two right angle faces disposed respectively adjacent and substantially parallel to the other of said right angle faces of said first and second reflecting prisms and having its hypotenuse face substantially parallel to a plane passing through the axes of said objective lens units, said three prisms being disposed within said housing enclosure.

3. A photographic reversing unit comprising a housing providing spaced apart front and rear walls and an intermediate wall providing therewith a substantially dust-proof enclosure, spaced sets of objective lens elements carried by said housing and having their axes offset a distance less than the diameter of one of said lens elements, a first right angle reflecting prism having one right angle face disposed contiguous the interior face of and in axial alignment with and normal to the axis of one of said objective lens sets, a second substantially identical right angle reflecting prism having one right angle face disposed contiguous the interior face of and in axial alignment with and normal to the axis of the other of said objective lens sets, and a third substantially identical right angle reflecting prism intermediate said first and second right angle reflecting prisms and having its two right angle faces disposed respectively adjacent and substantially parallel to the other of said right angle faces of said first and second reflecting prisms and having its hypotenuse face substantially parallel to a plane passing through the axes of said objective lens units, said three prisms being disposed within said housing enclosure.

4. A photographic reversing unit comprising a housing, spaced sets of objective lens elements carried by said housing, the axes of the respective sets of lens elements being offset with respect to each other and extending in generally parallel relationship, and prism means comprising first, second and third right angle reflecting prisms disposed between said sets of lens elements, a right angle side of the first said prism facing one set of said lens elements in symmetrical axial relationship, a right angle side of the said third prism being similarly arranged with respect to the other set of lens elements, the said right angle sides of said first and third prisms being so disposed angularly that their respective diagonals lie in substantially parallel planes normal to said axes of said objective lens elements and in a common plane passing through said axes, said second prism being disposed intermediate said first and third prisms and having its right angle sides in rigid rectangular alignment with and contiguous to respective of the other right angle sides of said first and third prisms and having its hypotenuse side substantially parallel to a plane passing through the axes of said objective lens sets.

5. A photographic reversing unit comprising a housing, spaced sets of objective lens elements carried by said housing, the axes of the respective sets of lens elements being offset with respect to each other and extending in generally parallel relationship, prism means comprising first, second and third right angle reflecting prisms disposed between said sets of lens elements, a right angle side of the first said prism facing one set of said lens elements in symmetrical axial relationship, a right angle side of the said third prism being similarly arranged with respect to the other set of lens elements, the said right angle sides of said first and third prisms being so disposed angularly that their diagonals lie substantially in a plane normal to and passing through the axes of said objective lens sets, said second prism being disposed intermediate said first and third prisms and having its right angle sides in rectangular alignment with and contiguous to respective of the other right angle sides of said first and third prisms and having its hypotenuse side substantially parallel to a plane passing through the axes of said objective lens sets, and four opaque shields respectively interposed between said first prism and first lens set and between contiguous faces of said first and second prisms and between contiguous faces of said second and third prisms and between said third prism and second lens set, said shields being provided with central apertures.

6. A photographic reversing unit adapted to be detachably associated with the lens board of a camera or the like, comprising a housing, an objective lens in said housing and comprising spaced sets of lens elements disposed respectively in opposed front and rear walls of said housing, and three right angle reflecting prisms assembled in fixed position within a holder separate from but rigidly secured interiorly of said housing, a first of said right angle reflecting prisms having one right angle face disposed adjacent the interior face of and in axial alignment with and normal to the axis of one of said objective lens sets, and a second of said right angle reflecting prisms having one right angle face disposed adjacent the interior face of and in axial alignment with and normal to the axis of the other of said objective lens sets, and the third of said right angle reflecting prisms being intermediate said first and second right angle reflecting prisms and having its two right angle faces disposed respectively adjacent and substantially parallel to the other of said right angle faces of said first and second reflecting prisms and having its hypotenuse face substantially parallel to a plane passing thorugh the axes of said objective lens units, the axis of the projecting light beam as it leaves said reversing unit being parallel or substantially so with respect to the axis of the projecting light beam as it enters said reversing unit.

STEPHEN N. WEKEMAN.

REFERENCES CITED

The following references are of record in the file of this patent:

UNITED STATES PATENTS

| Number | Name | Date |
| --- | --- | --- |
| Re. 17,995 | Mitchell | Mar. 10, 1931 |
| 463,123 | Hetherington | Nov. 10, 1891 |
| 1,268,577 | Jones | June 4, 1918 |
| 1,278,132 | Fulford et al. | Sept. 10, 1918 |
| 2,107,829 | Kuppenbender | Feb. 8, 1938 |
| 2,137,570 | Gilmore | Nov. 22, 1938 |
| 2,275,905 | Huebner | Mar. 10, 1942 |
| 2,282,656 | Huebner | May 12, 1942 |
| 2,284,562 | Dittmann | May 26, 1942 |

FOREIGN PATENTS

| Number | Country | Date |
| --- | --- | --- |
| 142,184 | Switzerland | Nov. 17, 1930 |